United States Patent [19]

Barton

[11] Patent Number: 5,520,210

[45] Date of Patent: May 28, 1996

[54] PROTECTIVE SHIELD FOR FIRE HYDRANT

[76] Inventor: James M. Barton, 6916 Shepherd Canyon Rd., Oakland, Calif. 94611

[21] Appl. No.: 526,597

[22] Filed: Sep. 11, 1995

[51] Int. Cl.⁶ .................. F16K 35/00; E03R 9/06
[52] U.S. Cl. .............. 137/296; 137/382.5; 251/291
[58] Field of Search .................. 137/294, 296, 137/382, 382.5, 800; 138/96 T; 220/284; 251/291

[56]  References Cited

U.S. PATENT DOCUMENTS

| | | | |
|---|---|---|---|
| 3,709,249 | 1/1973 | Diaz | 137/296 |
| 3,935,877 | 2/1976 | Franceschi | 137/296 |
| 4,182,361 | 1/1980 | Oakey | 137/296 |
| 4,369,807 | 1/1983 | Camp | 137/296 |
| 4,379,469 | 4/1983 | Britz | 137/296 |
| 4,484,595 | 11/1984 | Vanek et al. | 137/296 |
| 4,566,481 | 1/1986 | Leopold, Jr. et al. | 137/296 |
| 4,633,896 | 1/1987 | Bainbridge et al. | 137/296 |
| 4,936,336 | 6/1990 | McCauley et al. | 137/296 |
| 5,033,501 | 7/1991 | Stehling | 137/296 |
| 5,383,495 | 1/1995 | Kennedy | 137/296 |

*Primary Examiner*—George L. Walton
*Attorney, Agent, or Firm*—Bruce H. Johnsonbaugh

[57] ABSTRACT

A protective shield for a fire hydrant operating stub is provided which allows direct access to the operating stub by standard authorized tools without requiring the removal of any portion of the shield. The shield includes an inner ring with a peripheral groove which carries a snap ring. A cylindrical outer ring is carried on the snap ring and rotates freely on the snap ring without causing the operating stub to rotate. The outer ring preferably has two recesses formed in its surface to allow placement of authorized tools directly on the operating stub without removing any portion of the shield and the recesses are formed to prevent placement of standard pipe wrenches on the operating stub.

4 Claims, 3 Drawing Sheets

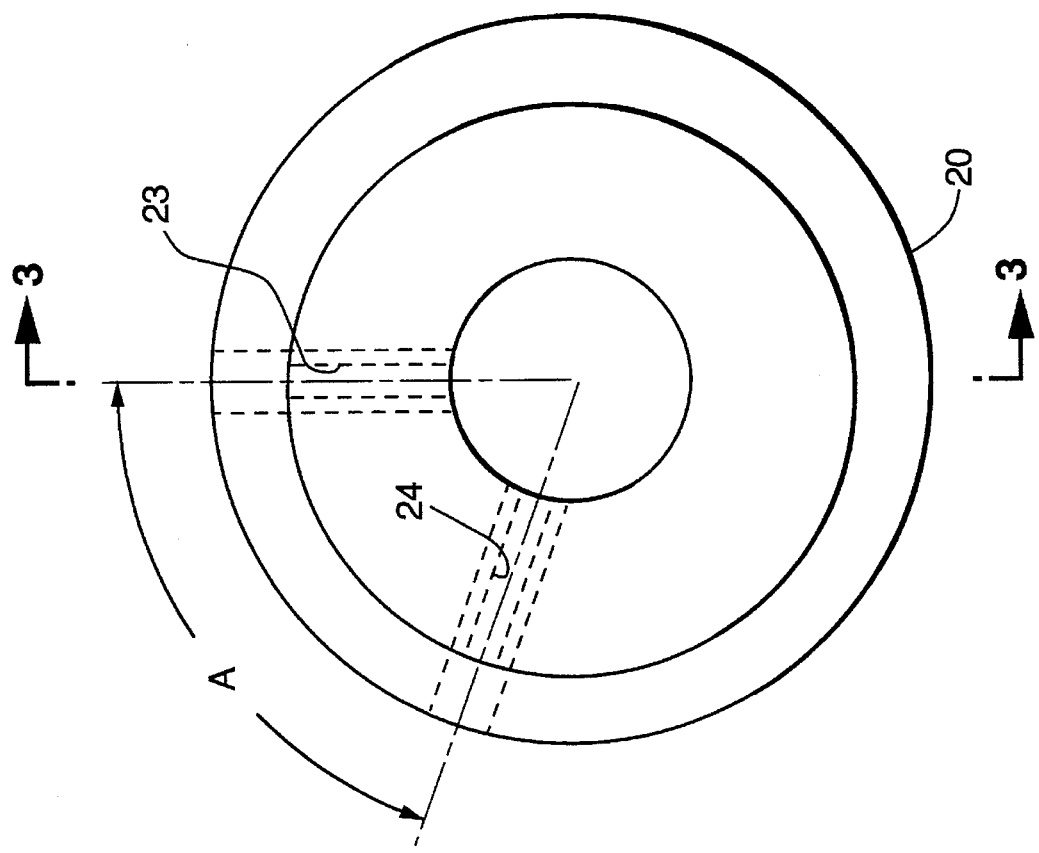
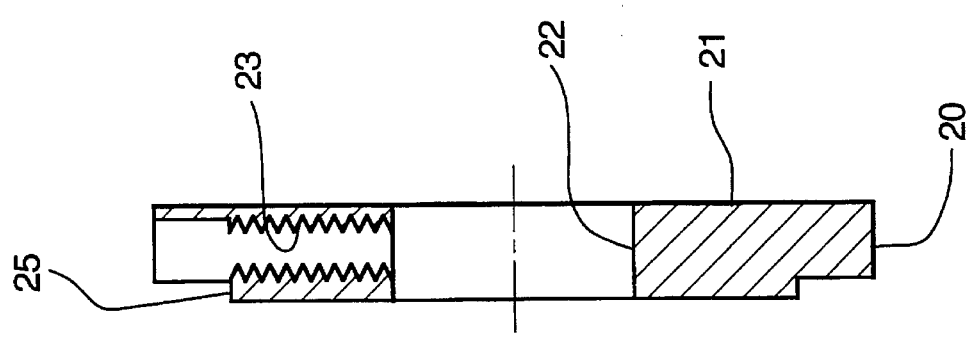

PROTECTIVE SHIELD FOR FIRE HYDRANT

BACKGROUND AND SUMMARY OF THE INVENTION

The present invention relates generally to protective devices for fire hydrants. More particularly, the present invention provides an inexpensive, simple and sturdy mechanism which is highly effective in preventing unauthorized users from opening a fire hydrant and simultaneously provides a device which does not have to be removed prior to authorized use of the hydrant.

The prior art includes a variety of protective devices for fire hydrants. Most of these devices are expensive and must be removed before the fire hydrant can be operated. Some of the prior art devices are difficult to retrofit onto an existing hydrant. Another disadvantage of some of the prior art mechanisms is that the mechanism provides an intermediate member between the operating stub of the hydrant and the authorized tool so that the tool actuates an intermediate member which, in turn, actuates the operating stub. The weakness of such designs is that, if the intermediate member fails for any reason, the hydrant may not be actuated. A significant drawback to virtually all the prior art designs known to the applicant is that precious time is required either to remove a portion of the protective device to gain access to the operating stub of the hydrant or to apply a special tool to the operating stub.

The prior art mechanisms include the Kennedy U.S. Pat. No. 5,383,495 dated Jan. 24, 1995 having a dome which completely covers the operating stub and which requires a special tool to remove the dome. The Leopold et al U.S. Pat. No, 4,566,481 dated Jan. 28, 1986 teaches another mechanism which totally encloses the operating stub and requires a special and expensive operating wrench in order to actuate the hydrant. A further drawback of the Leopold design is that it does not lend itself to being retrofitted onto existing fire hydrants. The Oakey U.S. Pat. No. 4,182,361 dated Jan. 8, 1980 teaches another device completely enclosing the actuating stub. The Franceschi U.S. Pat. No. 3,935,877 dated Feb. 3, 1976 teaches a dome-shaped mechanism which completely covers the actuating stub and which requires the use of a cumbersome and expensive operating tool. The Diaz U.S. Pat. No. 3,709,249 dated Jan. 9, 1973 teaches a dome-shaped mechanism which requires a special actuating tool to engage a flat intermediate surface 34 which, in turn, engages the operating stub of the hydrant. A device sold by McGard Company under its registered trademark "Intimidator" includes a dome covering the operating stub, requires a special tool, and is relatively expensive.

The present invention provides an inexpensive, sturdy effective shield which may be readily retrofitted onto existing hydrants, which does not have to be removed in order to actuate the operating stub of the hydrant. The device of the present mechanism in its preferred embodiment is designed to allow fire departments and water districts to utilize standard and commercially available operating tools to actuate the hydrant stub without removing the shield.

A primary object of the invention is to provide a sturdy, yet inexpensive, protective shield for fire hydrants which may be readily applied to existing hydrants and which does not have be removed prior to actuating the hydrant.

Another object of the invention is to provide a protective shield for fire hydrants which allows actuation of the hydrant by standard hydrant wrenches without removal of the shield and which also prevents actuation of the hydrant by standard pipe wrenches.

Other objects and advantages of the invention will become apparent from the following description of the drawings wherein:

BRIEF DESCRIPTION OF THE DRAWINGS

FIG. 3 is a sectional view of the inner ring portion of the shield;

FIG. 4 is a front elevational view of the inner ring shown in FIG. 2;

DETAILED DESCRIPTION OF THE DRAWINGS

Figure 1:
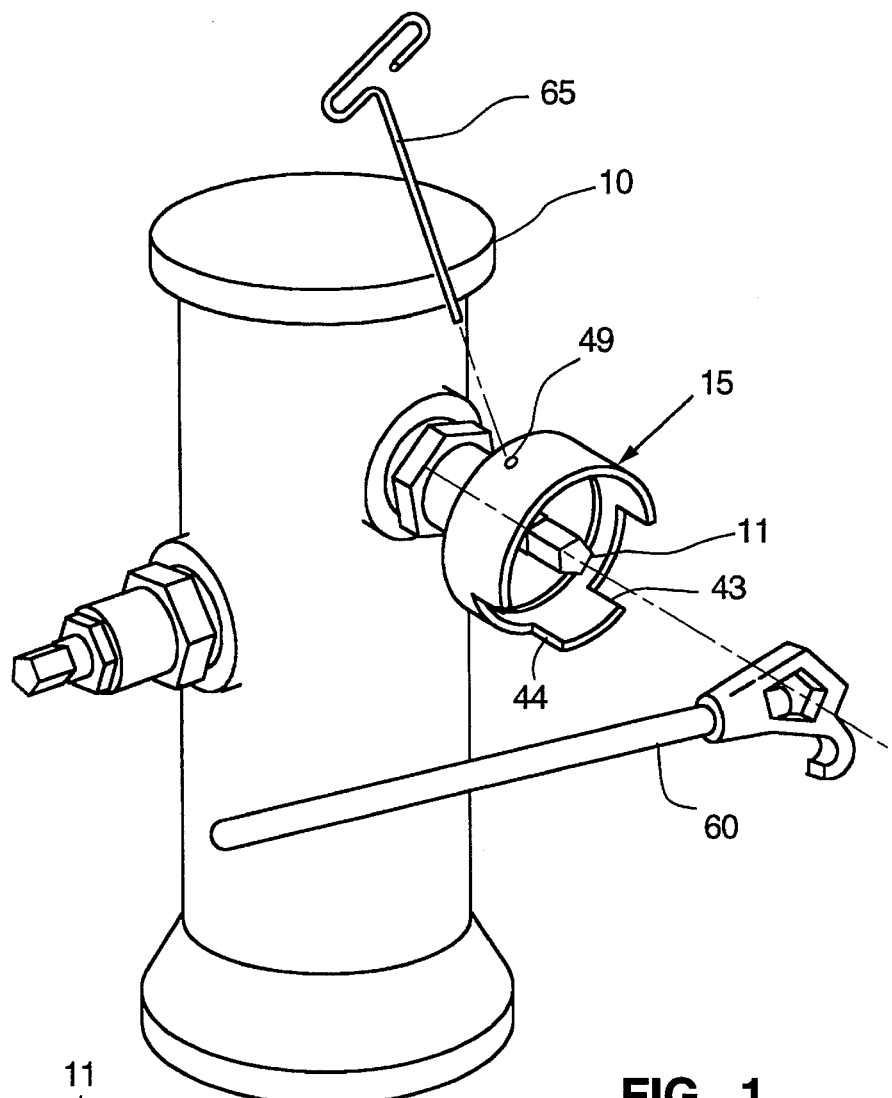
FIG. 1 is a perspective view of a standard hydrant with the shield installed.
Figure 2:
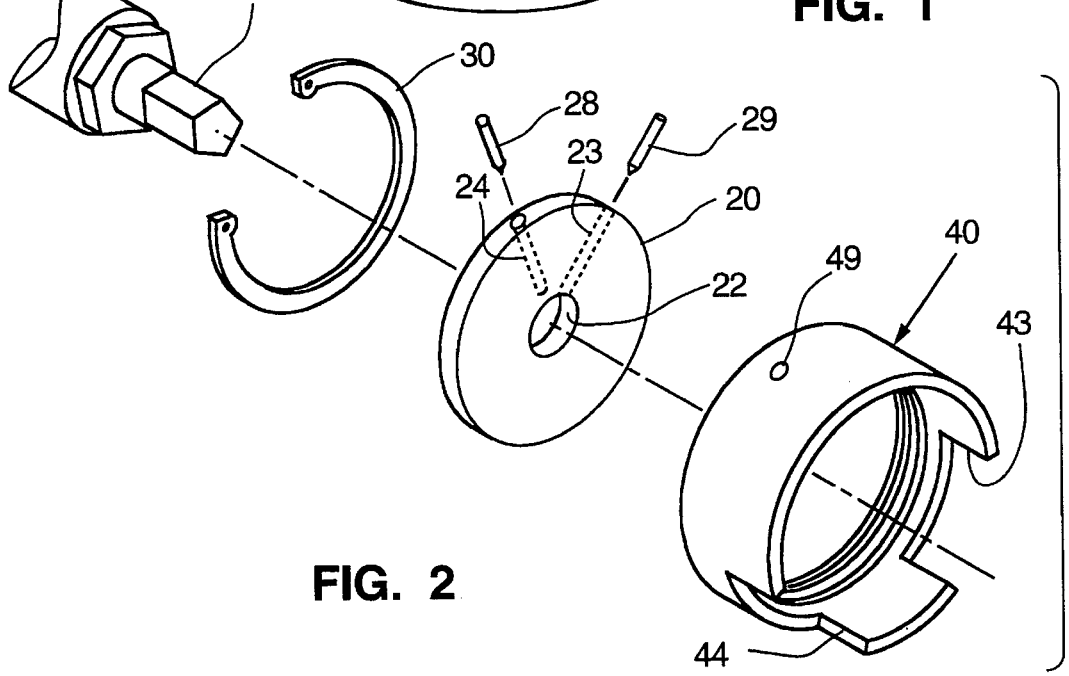
FIG. 2 is a perspective, exploded view of the protective shield shown in conjunction with a standard hydrant operating stub.

FIGS. 1 and 2 show perspective views of the protective shield as it is applied to a standard hydrant 10. Hydrant 10 has the ordinary pentagonal operating stub 11. Without any protective shield over stub 11, individuals may use a common pipe wrench to rotate the operating stub 11 to open the hydrant.

The protective shield shown generally as 15 comprises three separate parts. Inner ring 20, also shown in FIGS. 3 and 4, comprises a circular steel ring 21 having a central passageway 22 extending therethrough large enough to easily fit over operating stub 11. Ring 21 also carries two threaded passageways 23 and 24 for receiving set screws 28 and 29. Inner ring 21 also has a peripheral circular groove 25 formed therein to carry snap ring 30. Passageways 23 and 24 form an angle A of 72° so that the set screws are oriented perpendicular to the pentagonal surfaces of stub 11. Although ring 21 can perform its function of securing the protective shield 15 to the stub 11 with one set screw, it is preferred to utilize two set screws as shown in FIGS. 2 and 3.

Outer ring means 40 is preferably generally cylindrical having a smooth outer surface 41 and a mounting groove 42 formed therein so that the outer ring means 40 rotates freely on the snap ring 30. Rotation of ring means 40 will not in any way induce rotation of the operating stub 11. Although outer ring means 40 is shown in the drawings as being cylindrical, it is within the scope of this invention that the surface 41 may be of other configurations besides circular. However, the preferred shape is cylindrical as shown in the drawings.

Figure 6:
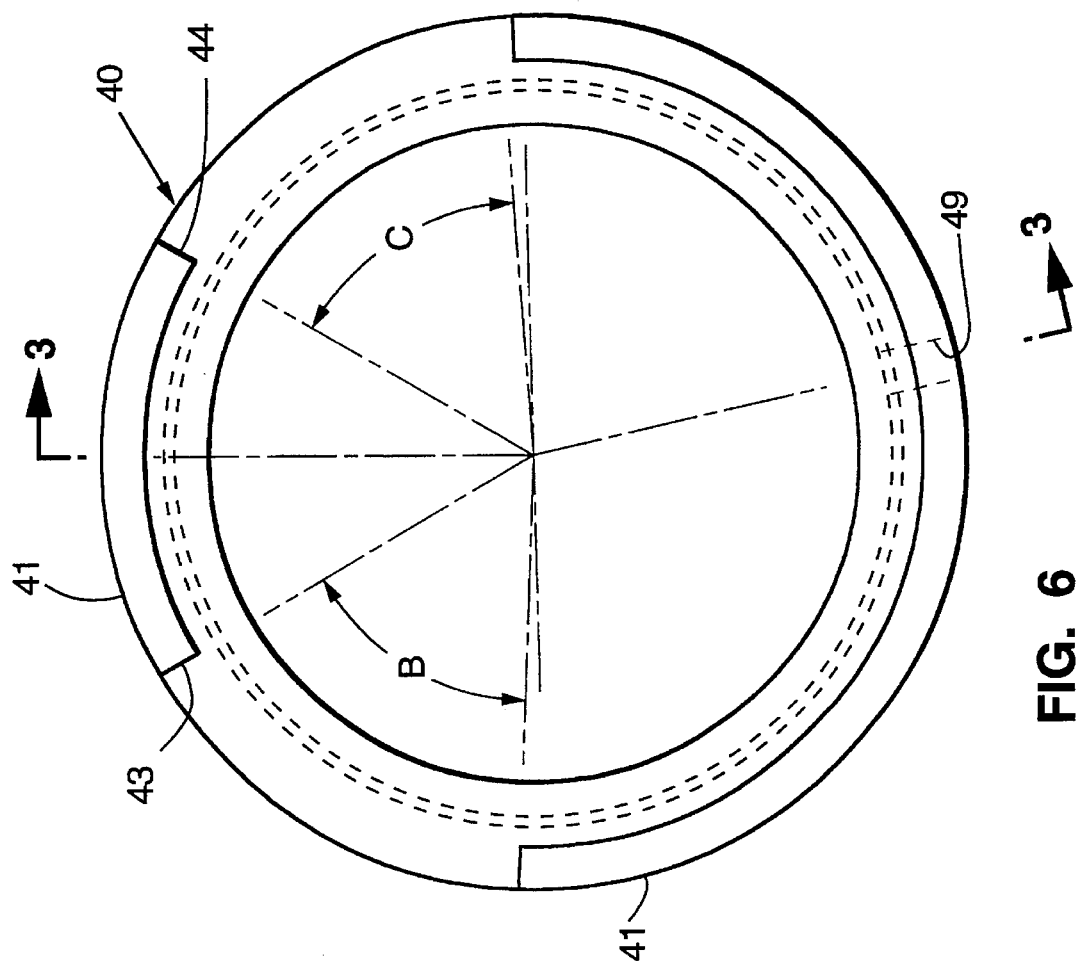
FIG. 6 is a front elevational view of the outer ring.
Figure 5:
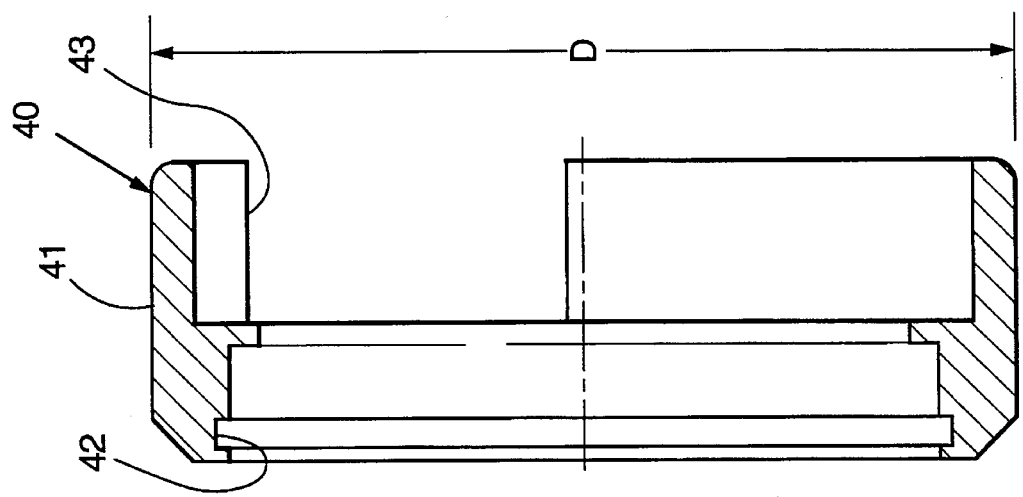
FIG. 5 is a sectional view of the outer ring.

Two recesses 43 and 44 are formed in surface 41. Both recesses 43 and 44 subtend arcs B and C of approximately 60° as shown best in FIG. 6. Recesses 43 and 44 are sufficiently deep to expose more than one-half of the operating stub 11 to a tool that fits through recesses 43 and 44. Furthermore, as shown in FIG. 6, recesses 43 and 44 are formed in the top half of ring 41 and subtend an arc of less then 180°. By forming recesses 43 and 44 in this fashion, standard, commercially available actuating tools 60 may be placed directly on stub 11 with portions of the tool 60 extending through recesses 43 and 44. However, recesses 43 and 44 are formed and positioned to prevent the placement of commercially available pipe wrenches on stub 11. The preferred embodiment of the outer ring means 40 includes an outer diameter D, as shown in FIG. 4, of approximately 4.4 inches. As used herein and in the claims, the phrase "approximately 4.4 inches" extends from 4.0 inches to 4.8 inches. As used herein and in the claims, the phrase "approximately 60°" for the arc subtended by recesses 43 and 44 includes arcs ranging from 55° to 65°. By sizing the outer diameter of outer ring means 40 and placing and sizing recesses 43 and 44 as shown, the use of a standard operating wrench 60 by authorized users is facilitated. It is also within the scope of this invention to use one recess, but two recesses are preferred. The user may apply the wrench 60 to operating stub 11 without removing any portion of the shield 15. A standard pipe wrench large enough to turn the stub 11 cannot be placed on the operating stub 11 because portions of the pipe wrench contact portions of the surface 41 and prevent the jaws of a pipe wrench from gripping the stub 11.

As shown best in FIGS. 1 and 6, outer ring means 40 has a passageway 49 formed therethrough to allow access to the heads of the set screws 28 and 29 for mounting the shield onto the stub 11 as well as for removing the shield from stub 11. Wrench 65 is used to turn set screws 28 and 29.

The shield shown and described herein is simple in design, inexpensive and may be readily retrofitted onto existing hydrants. Fire departments and water districts do not have to purchase special actuating tools to operate the stub 11.

What is claimed is:

1. A protective shield for a fire hydrant operating stub wherein the shield allows direct access to said operating stub by standard, commercially available, authorized tools without removing any portion of said shield, comprising:

an inner ring carrying at least one set screw, said ring mountable on said operating stub by said set screw, said inner ring having an arcuate groove near its periphery adapted to carry a snap ring, a snap ring carried by said arcuate groove in said inner ring, and an outer ring means carried by and rotatable on said snap ring, said outer ring means having a surface open at both ends to allow direct access to said operating stub, said outer ring means having at least one recess provided in one of its end surfaces to allow placement of authorized tools directly on said operating stub without removing any portion of said protective shield, and said recess being positioned to prevent placement of any standard pipe wrenches on said operating stub.

2. The apparatus of claim 1 wherein said inner ring carries two set screws and said outer ring is cylindrical.

3. The apparatus of claim 1 wherein said outer ring means is cylindrical and has two recesses provided in said one of its end surfaces, wherein each recess subtends an arc of approximately 60 degrees, and both of said recesses are formed within an arc of less than 180 degrees.

4. The apparatus of claim 3 wherein the outer diameter of said outer ring means is approximately 4.4 inches.

* * * * *